United States Patent
Cummings et al.

(10) Patent No.: US 6,340,228 B1
(45) Date of Patent: Jan. 22, 2002

(54) CONFORMABLE SOFT NOSE PADS

(75) Inventors: Thomas A. Cummings, Jackson; David Nowak, Dexter; Byung Jin Chang, Ann Arbor, all of MI (US)

(73) Assignee: General Scientific Corporation, Ann Arbor, MI (US)

( * ) Notice: Subject to any disclaimer, the term of this patent is extended or adjusted under 35 U.S.C. 154(b) by 0 days.

(21) Appl. No.: 09/645,628

(22) Filed: Aug. 24, 2000

(51) Int. Cl.⁷ .................................................. G02C 5/12
(52) U.S. Cl. ........................................ 351/136; 351/137
(58) Field of Search .................................. 351/136, 137, 351/138, 78, 79, 80

(56) References Cited

U.S. PATENT DOCUMENTS

| | | | |
|---|---|---|---|
| 1,048,191 A | 12/1912 | Maurice | 351/136 |
| 1,708,208 A | 4/1929 | Day | 351/136 |
| 2,298,502 A | 10/1942 | Nerney | 351/136 |
| 3,043,191 A | 7/1962 | Lanski | 351/136 |
| 3,701,592 A | * 10/1972 | Fermandez | 351/130 |
| 4,131,341 A | * 12/1978 | Bradley, Jr. | 351/137 |

* cited by examiner

Primary Examiner—Huy Mai
(74) Attorney, Agent, or Firm—Gifford, Krass, Groh, Sprinkle, Anderson & Citkowski, PC

(57) ABSTRACT

A formable nose pad distributes the weight of eyeglasses and accessories supported by the eyeglass frames over a large area of the wearer's nose. The nose pad has two inner tabs that can be formed to fit the wearer's nose, outer tabs that can be formed to fit the undersides of the eyeglass lenses and a flange through which the nose pad is attached to the eyeglass bridge. Slotted screw holes on the flange allow for height adjustment to fit the height of the wearer's nose.

10 Claims, 1 Drawing Sheet

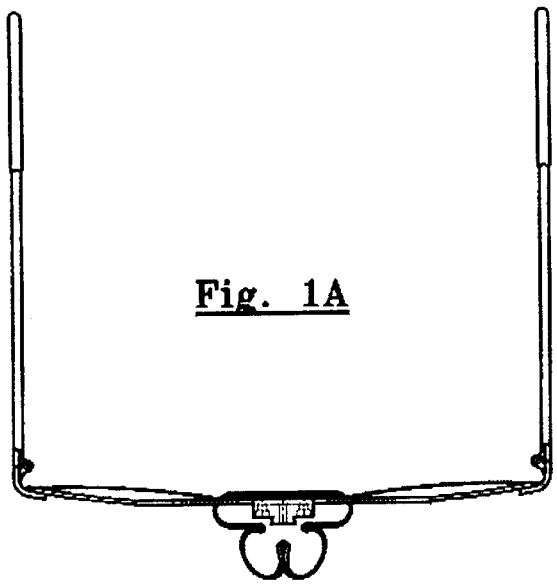
Fig. 1A
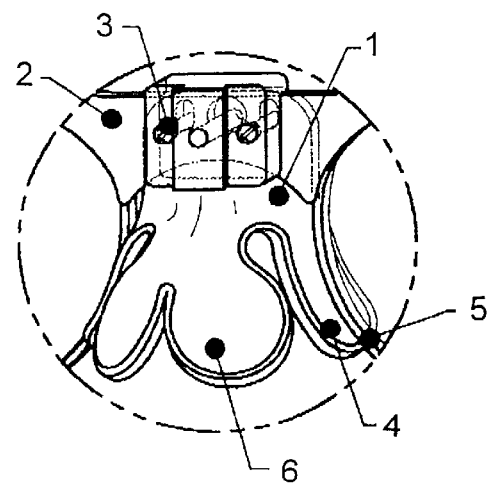
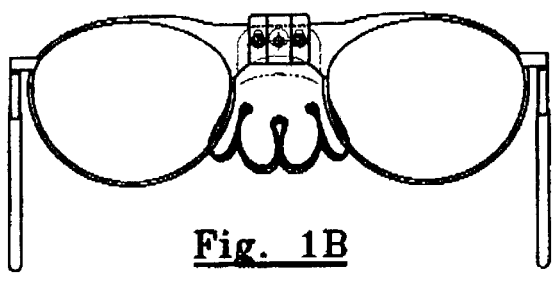
Fig. 1B
Fig. 2
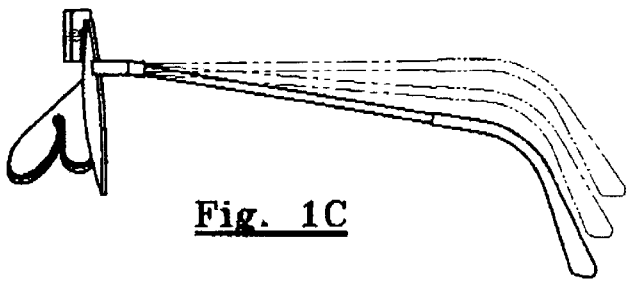
Fig. 1C

CONFORMABLE SOFT NOSE PADS

FIELD OF THE INVENTION

The present invention relates to nose pads for eyeglass frames, and in particular to a formable nose pad that distributes the weight of eyeglasses and accessories supported by the eyeglass frames over a large area of the wearer's nose thereby reducing pressure and irritation.

BACKGROUND OF THE INVENTION

Eyeglass frames are typically supported by the arms of the frames behind the ears and by the nose pads, which transfer significant weight on the nose through small contact areas, frequently causing discomfort, redness, irritation, and even scarring after prolonged use.

The problem is exacerbated when the nose pads are relied upon to keep the lenses from sliding down the nose of the wearer, and it becomes particularly acute for frames that must support heavy lenses or for frames associated with special activities requiring the mounting of viewing instruments on the frames, such as medical examinations, diagnostic procedures and surgical operations.

The common approach in addressing the problem has been to design better cushioned nose pads, non-slip pads, breathable pads, pads with slots and pads using a variety of ingenious designs, which, however, still leave the crux of the problem unresolved: the contact area between the nose and the pad is still small, resulting in localized stress magnification, the root of discomfort and pain, and the pads are not custom formable for the nose of the wearer.

SUMMARY OF THE INVENTION

The subject nose pad is ergonomically designed to distribute the weight of eyeglasses and any other accessories attached to the eyeglasses over a larger area of the wearer's nose than is customary in the prior art nose pads. The distribution of the weight over a larger area results in lower pressure, and therefore, less discomfort and irritation, particularly over prolonged use. The nose pad can be custom contoured by the wearer to fit the shape of the wearer's nose, as well as the undersides of the eyeglass lenses to aid in weight distribution. In the preferred embodiment, the nose pad is a shaped, layered surface, having a formable layer of soft aluminum, which is capable of being easily contoured by the wearer, yet stiff enough to retain its new shape. A padded layer made of hypoallergenic or other non-irritating, non-slip padding adheres to the underside of the aluminum layer that comes in contact with the wearer's nose.

The contouring of the nose pad is facilitated by its looped shape: the pad includes two inner tabs that can be formed to fit the wearer's nose, and two outer tabs that can be formed to fit the underside of the eyeglass lenses for further weight distribution.

The nose pad also includes a flange which is used to attach the pad to the eyeglass bridge with screws or other easily removable means of attachment, so that the nose pad can be replaced, when necessary. The flange has slotted screw holes which allow for a range of vertical adjustments to accommodate the height of the wearer's nose.

In one embodiment, the flange is attached to the eyeglass frame by means of a height adjustment piece of the type disclosed in issued U.S. Pat. No. 5,870,166, entitled Versatile Optical Mounting Assembly.

In another embodiment, the flange has sufficient length to be foldable over the bridge forming a loop, the opposite sides of which can be attached with screws.

BRIEF DESCRIPTION OF DRAWINGS

FIG. 1a shows a top view of the subject nose pad attached to the eyeglass frames;

FIG. 1b shows a front view of the subject nose pad attached to the eyeglass frames;

FIG. 1c shows a front view of the subject nose pad attached to the eyeglass frames; and FIG. 2 shows a detailed view of the subject nose pad and the attachment to the eyeglass bridge.

DETAILED DESCRIPTION OF THE INVENTION

FIG. 1 shows a top, front and side view of the nose pad on the eyeglass frames.

FIG. 2 is a detailed view of the nose pad, which includes two inner tabs 6 that can be formed to fit the nose of the wearer, two outer tabs 4 that can be formed to fit the underside 5 of the eyeglass lenses, and a flange 1. The flange is attached to the bridge 3 by means of height adjustment rail piece 3, the details of which are disclosed in U.S. Pat. No. 5,870,166 entitled Versatile Optical Mounting Assembly and incorporated herein by reference. The flange has slotted holes through which the screws of the height adjustment rail piece are threaded to provide the desired height for the wearer's nose. The nose pad may also be used with various optical mounting assemblies, which, for instance, can be mounted on the eyeglass bridge by using the same rail piece.

After repeated use, the nose pad may be replaced with a new one, and this is easily accomplished by removing the rail screws.

The nose pad is constructed using a thin, lightweight layer, for example soft aluminum, of a type that can be easily formed onto a given surface, such as the nose, and is still stiff enough to retain its shape. A soft, non-slip, thin layer of padding is attached to the formable layer to provide a cushioned, non-irritating, non-sliding surface for the nose.

It should be appreciated that while a basic shape with a flange, two inner tabs and two outer tabs is shown in FIGS. 1 and 2, other similar shapes and variations thereof are possible. Moreover, the nose pad may be constructed from a variety of materials and layers as long as they provide the basic requirements of forming and padding.

We claim:

1. A nose pad for eyeglasses having a bridge and eyeglass lenses, the nose pad comprising:
   a shaped, formable surface, having a flange, two outer tabs and two inner tabs,
   the inner tabs being formable to fit the wearer's nose,
   the outer tabs being formable to fit part of the undersides of the lenses, which are adjacent to the bridge; and
   means for removably mounting the flange to the eyeglass bridge.

2. The nose pad of claim 1, wherein the formable surface comprises:
   a layer of formable, lightweight material, capable of retaining its shape after being contoured to fit the wearer's nose and eyeglass lenses; and
   a layer of hypoallergenic padding adhering to the formable layer.

3. The nose pad of claim 2, wherein the formable material is soft aluminum.

4. The nose pad of claim 2, further including means for the vertical adjustment of the nose pad to the height of the wearer's nose.

5. The nose pad of claim 4, wherein the means for vertical adjustment of the nose pad to the wearer's nose comprise slotted holes through which the means for mounting the flange to the eyeglass bridge are disposed.

6. A nose pad for eyeglasses having a bridge and eyeglass lenses, the nose pad comprising:
- a shaped, formable surface, having a flange, two outer tabs and two inner tabs;
- the inner tabs being formable to fit the wearer's nose;
- the outer tabs being formable to fit the part of the undersides of the lenses, which are adjacent to the bridge;
- the flange being formable and of sufficient length to make a loop starting on one side of the bridge, going over the bridge and ending at the other side of the bridge; and
- means for removably attaching the flange to the eyeglass bridge by fastening together the part of the flange that forms the loop.

7. The nose pad of claim 6, wherein the formable surface comprises:
- a layer of formable, lightweight material, capable of retaining its shape after being contoured by the wearer; and
- a layer of hypoallergenic padding adhering to the formable layer.

8. The nose pad of claim 7, wherein the formable material is aluminum.

9. The nose pad of claim 7, further including means for vertical adjustment of the nose pad to the wearer's nose.

10. The nose pad of claim 9, wherein the means for vertical adjustment of the nose pad to the wearer's nose comprise slotted holes through which the means for mounting the flange to the eyeglass bridge are disposed.

* * * * *